United States Patent
Kitahama et al.

(10) Patent No.: US 11,644,332 B2
(45) Date of Patent: May 9, 2023

(54) AUTOMATED DRIVING VEHICLE MANAGEMENT SYSTEM, METHOD, AND PROGRAM

(71) Applicant: TOYOTA JIDOSHA KABUSHIKI KAISHA, Toyota (JP)

(72) Inventors: Kenichi Kitahama, Toyota (JP); Ryo Murakami, Susono (JP); Hisashi Iizuka, Susono (JP); Mitsunori Hosokawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/104,391

(22) Filed: Nov. 25, 2020

(65) Prior Publication Data

US 2021/0207973 A1   Jul. 8, 2021

(30) Foreign Application Priority Data

Jan. 6, 2020 (JP) .............................. JP2020-000580

(51) Int. Cl.
*G01C 21/36* (2006.01)
*B60W 60/00* (2020.01)
(Continued)

(52) U.S. Cl.
CPC ..... *G01C 21/3658* (2013.01); *B60W 60/0015* (2020.02); *G01C 21/3602* (2013.01); *G06V 20/58* (2022.01); *G06V 20/588* (2022.01)

(58) Field of Classification Search
CPC . B60W 60/0015; G06V 20/58; G06V 20/588; G01C 21/3658; G01C 21/3602
See application file for complete search history.

(56) References Cited

U.S. PATENT DOCUMENTS

| 2017/0355307 A1 | 12/2017 | Ha et al. |
| 2018/0099661 A1 | 4/2018 | Bae et al. |

(Continued)

FOREIGN PATENT DOCUMENTS

| CN | 109843676 A | * | 6/2019 | ............ B60R 1/00 |
| JP | 2011162132 A | | 8/2011 | |

(Continued)

OTHER PUBLICATIONS

Machine Translation of JP-2018197964-A (Year: 2018).*
Machine Translation of WO-2021111164-A1 (Year: 2021).*
Machine Translation of CN109843676A (Year: 2019).*

*Primary Examiner* — Rachid Bendidi
*Assistant Examiner* — Sahar Motazedi
(74) *Attorney, Agent, or Firm* — Oliff PLC

(57) ABSTRACT

The present disclosure provides an automated driving vehicle management system, a management method, an automated driving vehicle, and a program that are capable of appropriately managing the automated driving vehicle. The automated driving vehicle management system including: a map information storage unit that stores map information; an imaginary line management unit that manages an imaginary line imaginarily generated for a road included in the map information; and a communication unit that transmits imaginary line information about the imaginary line to a plurality of automated driving vehicles traveling along the imaginary line.

13 Claims, 10 Drawing Sheets

(51) Int. Cl.
    *G06K 9/00*           (2022.01)
    *G06V 20/58*         (2022.01)
    *G06V 20/56*         (2022.01)

(56) References Cited

U.S. PATENT DOCUMENTS

| | | |
|---|---|---|
| 2019/0078897 A1 | 3/2019 | Sumizawa |
| 2019/0371175 A1 | 12/2019 | Joos et al. |
| 2019/0384296 A1 | 12/2019 | Shashua et al. |
| 2020/0051436 A1* | 2/2020 | Ochida ................ G08G 1/0125 |
| 2020/0082724 A1* | 3/2020 | Oguro ..................... B62D 6/00 |

FOREIGN PATENT DOCUMENTS

| | | |
|---|---|---|
| JP | 2018-106255 A | 7/2018 |
| JP | 2018197964 A * | 12/2018 |
| WO | 2017/065182 A1 | 4/2017 |
| WO | 2018/123019 A1 | 7/2018 |
| WO | 2018/179252 A1 | 10/2018 |
| WO | WO-2021111164 A1 * | 6/2021 |

* cited by examiner

AUTOMATED DRIVING VEHICLE MANAGEMENT SYSTEM, METHOD, AND PROGRAM

CROSS REFERENCE TO RELATED APPLICATIONS

This application is based upon and claims the benefit of priority from Japanese patent application No. 2020-000580, filed on Jan. 6, 2020, the disclosure of which is incorporated herein in its entirety by reference.

BACKGROUND

The present disclosure relates to an automated driving vehicle management system, a management method, an automated driving vehicle, and a program.

Japanese Unexamined Patent Application Publication No. 2011-162132 discloses an automated driving apparatus that controls a vehicle so as to travel along a road. In Japanese Unexamined Patent Application Publication No. 2011-162132, the vehicle includes a lane information detection unit. The lane information detection unit includes a camera for shooting surroundings and an image processing apparatus. The camera for shooting surroundings shoots the surroundings of the vehicle. The image processing apparatus performs image processing on the shot image to thereby detect white lines and signs around the vehicle. Lane information is generated based on the detected lanes and signs.

SUMMARY

In such an automated driving technology, it is desirable to appropriately control an automated driving vehicle.

The present disclosure has been made to solve the aforementioned problem, and it provides a system, a management method, an automated driving vehicle, and a program that are capable of appropriately managing the automated driving vehicle.

A first exemplary aspect is an automated driving vehicle management system including: a map information storage unit configured to store map information; an imaginary line management unit configured to manage an imaginary line that is imaginarily generated for a road included in the map information; and a communication unit configured to transmit imaginary line information about the imaginary line to a plurality of automated driving vehicles that travel along the imaginary line.

In the aforementioned automated driving vehicle management system, the imaginary line may include at least one of: a division line that divides a lane in a traveling direction of the automated driving vehicle from a lane in a direction opposite to the traveling direction; a division line that divides the lanes in a traveling road on which the automated driving vehicles travel in the same direction in accordance with types of the traveling automated driving vehicles; and a division line that divides the lanes in the traveling road on which the automated driving vehicles travel in the same direction in accordance with speed limits of the automated driving vehicles.

In the aforementioned automated driving vehicle management system, the imaginary line management unit may be able to change a position of the imaginary line.

In the aforementioned automated driving vehicle management system, when there is an obstacle on the road, the imaginary line may be generated so that it avoids the obstacle.

The aforementioned automated driving vehicle management system further includes an imaginary stop line management unit configured to manage an imaginary stop line that is imaginarily generated for the road included in the map information, in which the communication unit may transmit imaginary line information about the imaginary stop line to the plurality of the automated driving vehicles, and the automated driving vehicles stop in accordance with the imaginary stop line.

In the aforementioned automated driving vehicle management system, the imaginary stop line management unit may generate the imaginary stop line so that it intersects the imaginary line.

In the aforementioned automated driving vehicle management system, the imaginary stop line management unit may generate the imaginary stop line so that it surrounds a parking area.

In the aforementioned automated driving vehicle management system, when there is an obstacle on the road, the imaginary stop line management unit may generate the imaginary stop line before and after the obstacle.

Another exemplary aspect is an automated driving system including: the aforementioned automated driving vehicle management system; and a plurality of vehicles that share map information and imaginary line information, in which each of the vehicles performs automated driving control so that it travels along the imaginary line.

In the automated driving system, at least the one vehicle includes display means for displaying a map corresponding to the map information, and the display means may superimpose and display the imaginary line on the map.

Another exemplary aspect is an automated driving vehicle management method including: transmitting map information to a plurality of vehicles; managing an imaginary line that is imaginarily generated for a road included in the map information; and transmitting imaginary line information about the imaginary line to a plurality of automated driving vehicles that travel along the imaginary line.

Another exemplary aspect is an automated driving vehicle including: a map information storage unit configured to store map information; a communication unit configured to receive imaginary line information about an imaginary line that is imaginarily generated for a road included in the map information; an imaginary line information storage unit configured to store the imaginary line information; and a control unit configured to perform automated driving control so that the automated driving vehicle travels on the road along the imaginary line.

Another exemplary aspect is a computer program for causing a computer to perform an automated driving vehicle management method, the automated driving vehicle management method including: transmitting map information to a plurality of vehicles; managing an imaginary line that is imaginarily generated for a road included in the map information; and transmitting imaginary line information about the imaginary line to a plurality of automated driving vehicles that travel along the imaginary line.

According to the present disclosure, it is possible to provide a system, a management method, an automated driving vehicle, and a program that are capable of appropriately managing the automated driving vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the present disclosure, the present disclosure according to claims is not limited to the following embodiments. Further, all the components described in the following embodiments are not necessarily essential as means for solving problems.

Figure 1:
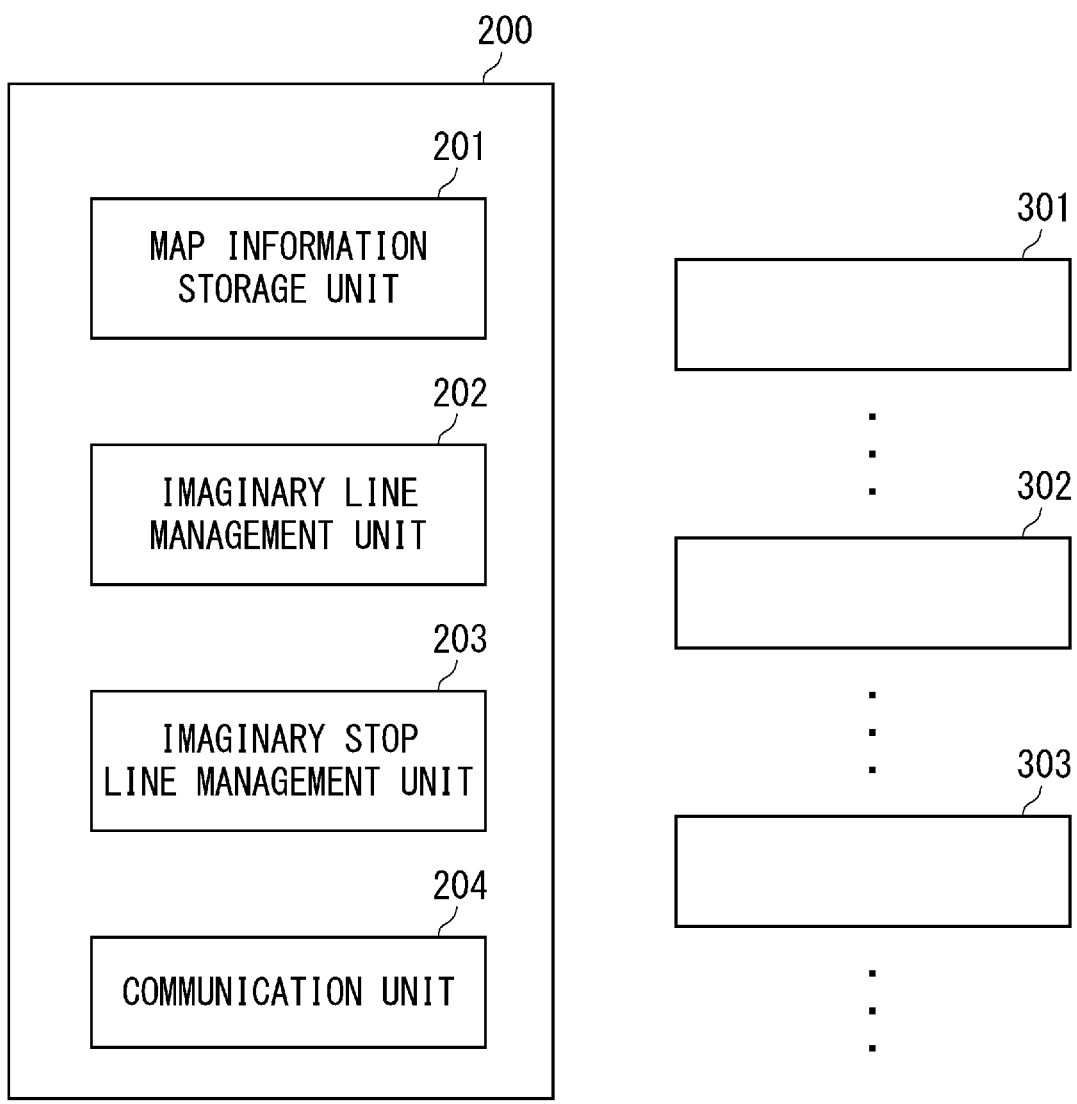
FIG. 1 is a block diagram showing an automated driving vehicle management system according to an embodiment.

An automated driving vehicle management system (hereinafter also simply referred to as management system or an automated driving system), an automated driving vehicle management apparatus (hereinafter also simply referred to as a management apparatus or a system), and an automated driving vehicle (hereinafter also simply referred to as a vehicle) according to an embodiment will be described below with reference to the drawings. FIG. 1 is a block diagram showing a configuration of a management system 100.

The management system 100 includes a management apparatus 200 and one or a plurality of vehicles. A unique identification ID may be assigned to each vehicle. It should be noted that the vehicles are classified into three types: a high-speed vehicle 301, a medium-speed vehicle 302, and a low-speed vehicle 303 in accordance with their respective speed limits. The high speed vehicle 301, the medium-speed vehicle 302, and the low-speed vehicle 303 are collectively referred to as the vehicle.

For example, the speed limit of the high-speed vehicle 301 is 35 km/h, the speed limit of the medium-speed vehicle 302 is 10 km/h, and the speed limit of the low-speed vehicle 303 is 5 km/h. The high-speed vehicle 301, the medium-speed vehicle 302, and the low-speed vehicle 303 travel within their respective speed limits. As a matter of course, the number of classifications of vehicles is not limited to three. The plurality of vehicles may be classified into two types, or four or more types in accordance with their respective speed limits. Further, the types of vehicles may be classified in accordance with information other than the speed limits. For example, the vehicles may be classified in accordance with the kind of the vehicle, the size thereof, and the like. As a matter of course, the types of vehicles may be classified in accordance with a plurality of attribute information pieces such as the speed limit of the vehicle and the size thereof.

Each of the high-speed vehicle 301, the medium-speed vehicle 302, and the low-speed vehicle 303 is an automated driving vehicle in which a passenger rides. That is, when a passenger or the like inputs a destination, the high-speed vehicle 301, the medium-speed vehicle 302, and the low-speed vehicle 303 perform automated driving to the destination. In this way, it is possible to transport a passenger to the destination. As a matter of course, each of the high-speed vehicle 301, the medium-speed vehicle 302, and the low-speed vehicle 303 may be an automated driving vehicle that conveys loads. That is, the high-speed vehicle 301, the medium-speed vehicle 302, and the low-speed vehicle 303 may be any vehicles that convey people or objects. Each of the high-speed vehicle 301, the medium-speed vehicle 302, and the low-speed vehicle 303 includes a control unit for performing automated driving. The control unit performs a steering operation, and an accelerating and braking operation.

The level of automated driving performed by each of the high-speed vehicle 301, the medium-speed vehicle 302, and the low-speed vehicle 303 is not limited to a particular level. For example, when the level of automated driving is a level 2, the control unit supports both the accelerating and braking operation and the steering operation. When the level of automated driving is a level 3, at a specific place, the control unit automatically performs both the accelerating and braking operation and the steering operation, and a driver performs the same in the event of an emergency. When the level of automated driving is a level 4, the control unit automatically performs both the accelerating and braking operation and the steering operation at a specific place. When the level of automated driving is a level 5, the control unit automatically performs both the accelerating and braking operation and the steering operation without limitation as to a place. The level of automated driving performed by each of the high-speed vehicle 301, the medium-speed vehicle 302, and the low-speed vehicle 303 may be 2 or higher, or 3 or higher. The level of automated driving performed by each of the high-speed vehicle 301, the medium-speed vehicle 302, and the low-speed vehicle 303 may be 4 or 5. Further, the levels of automated driving of the high-speed vehicle 301, the medium-speed vehicle 302, and the low-speed vehicle 303 may be different from one another.

The management apparatus 200 is, for example, an information processing apparatus such as a server apparatus. The management apparatus 200 includes a processor, a memory, and the like. The management apparatus 200 stores a management program for managing automated driving performed by the vehicle in a memory. The management apparatus 200 executes the management program, thereby managing automated driving performed by the vehicle. Note that the management apparatus 200 is not limited to a physically single apparatus. For example, a method for managing automated driving vehicles may be achieved by a plurality of information processing apparatuses connected to a network performing distributed processing.

The management apparatus 200 includes a map information storage unit 201, an imaginary line management unit 202, an imaginary stop line management unit 203, and a communication unit 204. The map information storage unit 201 includes a memory or the like, and stores map information of a traveling area where the vehicle travels. The map information includes information about roads, structures, facilities, and the like. For example, the map information includes information about the position, the width, the number of lanes, the shape, the direction, and the like of each road. Further, the map information includes information about the position, the shape, the size, and the like of the structures, the facilities, and the like. Position information of each of the roads, the structures, and the like is indicated by coordinates such as the latitude and the longitude, and the position information may further include altitude information. Further, the map information may be general-purpose data used for, for example, a navigation system. The management apparatus 200 can display a map corresponding to the map information.

The traveling area is an area in which the management apparatus 200 manages traveling by automated driving. The traveling area includes a plurality of roads. In order to make explanations simple, it is assumed here that the vehicles traveling in the traveling area are only automated driving vehicles. The traveling area is an area designed on the assumption that, like in a smart city, automated driving vehicles travel therein. As a matter of course, automated driving vehicles and manual driving vehicles may travel in the traveling area. That is, some of the vehicles traveling in the traveling area may be manual driving vehicles operated by a driver.

Figure 2:
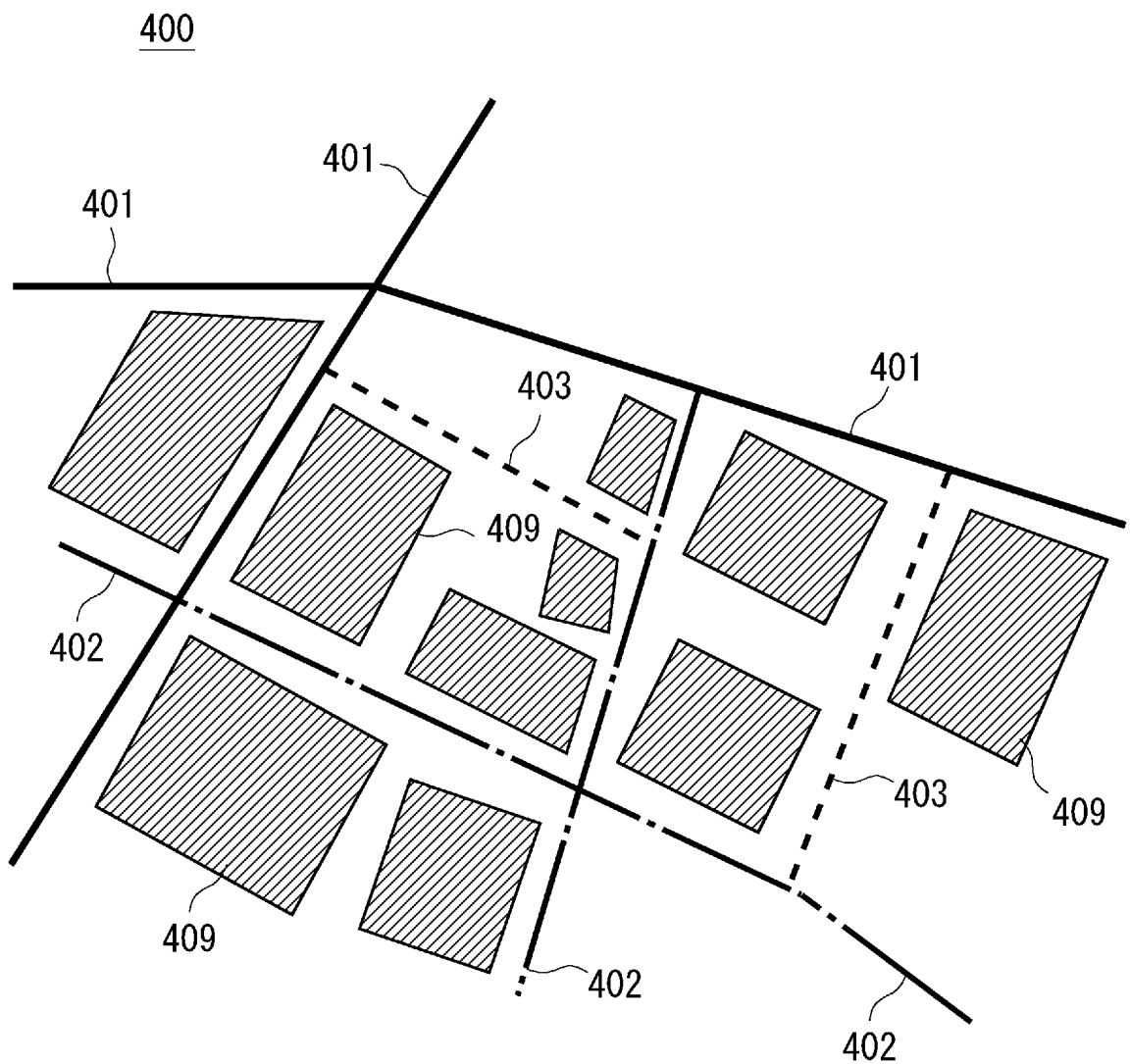
FIG. 2 is a diagram for explaining an example of a traveling area.

FIG. 2 is a diagram schematically showing a traveling area 400. In FIG. 2, a high-speed traveling road 401, a medium-speed traveling road 402, and a low-speed traveling road 403 are provided in the traveling area 400 as roads on which the vehicle can travel. That is, the roads are divided into three traveling roads: the high-speed traveling road 401, the medium-speed traveling road 402, and the low-speed traveling road 403 in accordance with the speed limits of the respective lanes. The speed limit of the high-speed traveling road 401 is 35 km/h, the speed limit of the medium-speed traveling road 402 is 10 km/h, and the speed limit of the low-speed traveling road 403 is 5 km/h.

The management apparatus 200 manages the vehicles capable of traveling along each traveling road. Only the high-speed vehicle 301 can travel on the high-speed traveling road 401. That is, the medium-speed vehicle 302 and the low-speed vehicle 303, each of which has a low-speed limit, are prohibited from entering the high-speed traveling road 401. Only the high-speed vehicle 301 and the medium-speed vehicle 302 can travel on the medium-speed traveling road 402. The low-speed vehicle 303 having the lowest speed limit is prohibited from entering the medium-speed traveling road 402. All the high-speed vehicle 301, the medium-speed vehicle 302, and the low-speed vehicle 303 can travel on the low-speed traveling road 403.

In other words, the low-speed vehicle 303 can travel only on the low-speed traveling road 403. The medium-speed vehicle 302 can travel only on the medium-speed traveling road 402 and the low-speed traveling road 403. The high-speed vehicle 301 can travel on all the high-speed traveling road 401, the medium-speed traveling road 402, and the low-speed traveling road 403. As described above, by managing the types of the traveling roads and the types of the vehicles in association with each other, the efficiency of transportation can be improved. As the medium-speed vehicle 302 and the low-speed vehicle 303 which travel at a low speed do not travel on the high-speed traveling road 401, the high-speed vehicle 301 can travel thereon at a high speed. Note that in the following description, the high-speed traveling road 401, the medium-speed traveling road 402, and the low-speed traveling road 403 are collectively referred to as the road.

In FIG. 2, the X direction may be, for example, an east-west direction, and the Y direction may be a north-south direction. As a matter of course, the X and the Y directions may be inclined from the east-west direction and the north-south direction, respectively. Structures 409 are located between adjacent roads. The structures 409 are residences, buildings, factories, and the like. In an area surrounded by the roads, facilities such as parks may be located instead of the structures 409. The road may be curved or bent in the middle thereof in accordance with the topography and the layout of the structures. Further, the width of the middle of the road may be changed.

In the map information, road type information indicating a type of the road may be added to each road. The road type information indicates which of the high-speed traveling road 401, the medium-speed traveling road 402, and the low-speed traveling road 403 each road corresponds to. Note that although the types of the roads are divided by each road, it is also possible to divide the types of the roads by each lane. For example, in a case where there are two lanes on each side of a road, it is possible to set the center lanes as the high-speed traveling roads (i.e., the high-speed lanes) 401 and the lanes on a sidewalk side as the medium-speed traveling roads (i.e., the medium-speed lanes) 402.

Referring again to FIG. 1, the explanation will be continued. The imaginary line management unit 202 manages an imaginary line in map information. The imaginary line is a straight line or a curved line imaginarily generated in two-dimensional map information. For example, the vehicle travels along the imaginary line. That is, the imaginary line serves as a guide line that defines a traveling direction (i.e., a direction in which the vehicle travels) of the vehicle. The imaginary line management unit 202 manages the position, the shape, and the like of the imaginary line on the map. The imaginary line management unit 202 generates, deletes, changes, or updates the imaginary line. Further, the imaginary line management unit 202 manages the type of imaginary line. Type information of the imaginary line may be changed in accordance with the elapse of time.

The imaginary stop line management unit 203 manages an imaginary stop line on the map. The imaginary stop line is a line that is imaginarily generated in the map information. For example, the vehicle stops in accordance with the imaginary stop line. That is, the imaginary stop line defines the position at which the vehicle stops. The imaginary stop line is a prohibition line that prohibits the vehicle from passing through. The imaginary stop line management unit 203 manages the position and the shape of the imaginary stop line on the map. Further, the imaginary line management unit 202 manages the type of the imaginary stop line.

The communication unit 204 transmits, to each vehicle, imaginary line information about the imaginary line and imaginary stop line information about the imaginary stop line. By doing so, a plurality of vehicles share the imaginary line information and the imaginary stop line information. Further, the communication unit 204 transmits the map information to each vehicle. By doing so, the plurality of vehicles share the map information. The vehicle performs automated driving control so that it travels on the roads included in the map information.

Each vehicle develops, in the map information, the imaginary line included in the imaginary line information. Similarly, each vehicle develops, in the map information, the imaginary stop line included in the imaginary stop line information. By doing so, the imaginary line is added to the map in the map information of the vehicle. Further, each vehicle performs automated driving control in accordance with the imaginary line and the imaginary stop line added to the map information. Each vehicle performs automated driving control based on the map information, the imaginary line information, and the imaginary stop line information shared by the plurality of vehicles. Thus, the management apparatus 200 can manage the automated driving performed by the plurality of vehicles.

The communication unit 204 may transmit these information pieces every time data is updated. Alternatively, the communication unit 204 may transmit these information pieces to the vehicle at fixed time intervals. The communication unit 204 may receive information from each vehicle. When a timing at which the imaginary line is updated and a timing at which the imaginary stop line is updated are known, the communication unit 204 may transmit in advance a time table or a time chart indicating these update timings.

Figure 3:
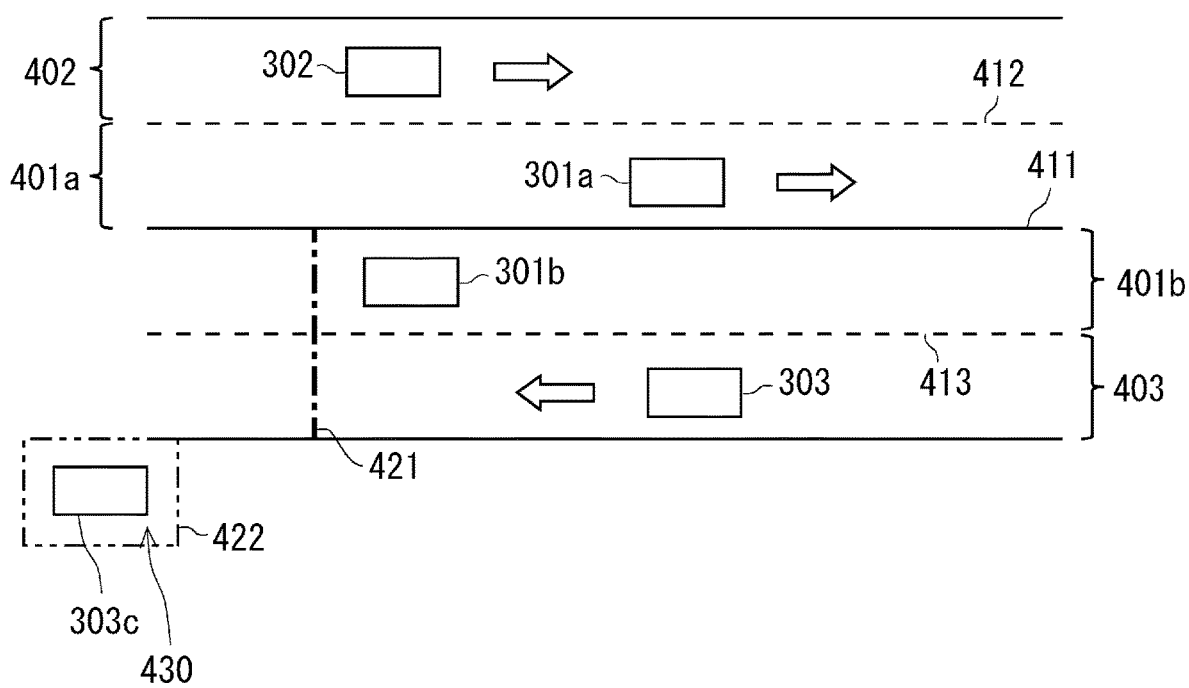
FIG. 3 is a diagram for explaining an imaginary line and an imaginary stop line.
Figure 3:
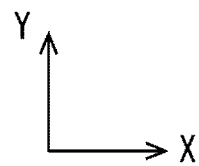

Examples of the imaginary line and the imaginary stop line are described with reference to FIG. 3. FIG. 3 is a diagram showing imaginary lines 411 to 413 and imaginary stop lines 421 and 422 formed on a road 410. FIG. 3 shows a part of the traveling area. FIG. 3 shows the four-lane road 410 having two lanes on each side. The road 410 is parallel to the X direction.

There are two lanes in which the vehicle travels in the +X direction: a high-speed traveling road (i.e., a high-speed lane) 401a and the medium-speed traveling road (i.e., the medium-speed lane) 402. There are two lanes in which the vehicle travels in the −X direction: a high-speed traveling road (i.e., a high-speed lane) 401b and the low-speed traveling road (i.e., the low-speed lane) 403. Further, a high-speed vehicle 301a is traveling on the high-speed traveling road 401a, and a high-speed vehicle 301b is traveling on the high-speed traveling road 401b. The medium-speed vehicle 302 is traveling on the medium-speed traveling road 402, and the low-speed vehicle 303 is traveling on the low-speed traveling road 403. The low-speed traveling road 403, the high-speed traveling road 401b, the high-speed traveling road 401a, and the medium-speed traveling road 402 are arranged in this order from the −Y side of the road 410 to the +Y side thereof.

The imaginary line 411 is a division line that divides a lane for a traveling vehicle from a lane for an oncoming vehicle. The imaginary line 411 is an imaginary line corresponding to a center line of the road. The imaginary line 411 is disposed between the high-speed traveling road 401a in the +X direction and the high-speed traveling road 401b in the −X direction. The imaginary line 411 defines a boundary between the high-speed traveling road 401a and the high-speed traveling road 401b which is a lane opposite to the high-speed traveling road 401a. In this example, the imaginary line 411 serves as a boundary line that divides the high-speed traveling road 401a on which the vehicle travels in the +X direction from the high-speed traveling road 401b on which the vehicle travels in the −X direction.

The imaginary line 412 is a division line drawn so that it divides the lanes in the traveling road on which the vehicles travel in the same direction in accordance with the types of the traveling vehicles. The imaginary line 412 is disposed between the high-speed traveling road 401a and the medium-speed traveling road 402, on both of which the vehicle travels in the +X direction. The imaginary line 412 is a boundary line that defines a boundary between the high-speed traveling road 401a and the medium-speed traveling road 402 which are traveling roads (i.e., lanes) on which the vehicles travel in the same direction. The high-speed traveling road 401a is formed between the imaginary lines 411 and 412. Further, the medium-speed traveling road 402 is formed between the imaginary line 412 and the +Y side of the road 410.

The imaginary line 413 is a division line drawn so that it divides the lanes in the traveling road on which the vehicles travel in the same direction in accordance with the speed limits of the vehicles. The imaginary line 413 is disposed between the high-speed traveling road 401b and the low-speed traveling road 403, on both of which the vehicle travels in the −X direction. The imaginary line 413 is a boundary line that defines a boundary between the high-speed traveling road 401b and the low-speed traveling road 403 which are traveling roads (i.e., lanes) on which the vehicles travel in the same direction. The high-speed traveling road 401b and the low-speed traveling road 403 have speed limits different from each other as described above.

As descried above, the imaginary lines 411 to 413 define the lanes in the road 410. That is, in the map information, the imaginary line 411 indicates the boundary between the lanes in the road 410. The vehicles travel between the imaginary lines 411 and 412 and between the imaginary lines 411 and 413 so that they do not go over these lines. For example, the high-speed vehicle 301a travels between the imaginary lines 411 and 412. In other words, the high-speed vehicle 301a travels while keeping a certain distance from each of the imaginary lines 411 and 412.

Similarly, the high-speed vehicle 301b travels between the imaginary lines 411 and 413. In other words, the high-speed vehicle 301b travels while keeping a certain distance from each of the imaginary lines 411 and 413. The medium-speed vehicle 302 travels between the imaginary line 412 and the +Y side of the road. The medium-speed vehicle 302 travels while keeping a certain distance from the imaginary line 412. The low-speed vehicle 303 travels between the imaginary line 413 and the −Y side of the road. The low-speed vehicle 303 travels while keeping a certain distance from the imaginary line 413. Note that in FIG. 3, each of the imaginary lines 411 to 413 is shown as a straight line parallel to the X direction, but may instead be curved or bent along the road.

Each vehicle performs steering control so as to follow the imaginary line. By doing so, the vehicle travels along the imaginary line, thereby enabling an appropriate automated driving control. The vehicle acquires its own position from a Global Positioning System (GPS), a vehicle speed pulse, and the like. Further, position information of the imaginary line is added to position information of the road included in map information. Thus, the vehicle can perform automated driving control along the imaginary lines 411 to 413. That is, each of the imaginary lines 411 to 413 serves as a guide line that defines a traveling direction of the vehicle.

For example, the vehicle performs steering control so that it does not protrude over the imaginary lines 411 to 413 which define the lanes on which the vehicle travels. As the vehicles travel along the imaginary lines 411, 412 and 413, the occurrence of an accident can be prevented. Further, in the traveling area 400 in which only the automated driving vehicle travels, it is not necessary to draw lines on the road. Thus, it is possible to easily manage the traveling area 400. All vehicles travel along the imaginary lines.

The imaginary line management unit 202 sets the imaginary line 411 that divides a lane on which its own vehicle travels from a lane opposite to this lane. It is thus possible to manage the automated driving vehicles more safely.

Further, the imaginary line management unit 202 sets the imaginary lines 412 and 413 each of which divides lanes on which the vehicles travel in the same direction. For example, the imaginary line 412 is a line drawn so that it divides the lanes in accordance with the types of vehicles. Thus, the management apparatus 200 can make the types of vehicles traveling in one lane uniform. For example, the management apparatus 200 can prevent the medium-speed vehicle 302, which cannot travel at a high speed, from entering the high-speed traveling road 401a. Thus, it is possible to improve the efficiency of transportation of the entire system.

The imaginary line 413 is a line drawn so that it divides the lanes in accordance with the speed limits of the vehicles. The management apparatus 200 can make the vehicle traveling in one lane for each speed limit uniform. For example, the management apparatus 200 can prevent the low-speed vehicle 303, which can travel only at a low speed, from entering the high-speed travel road 401b. Thus, it is possible to improve the efficiency of transportation of the entire system.

Each of the imaginary lines 411 to 413 defines the boundary between lanes, but the imaginary line may define the lanes. For example, the imaginary line may be a center line of the lanes. Alternatively, the imaginary line management unit 202 can add the width information of the imaginary line to the imaginary line, thereby managing the imaginary line as a lane itself.

The imaginary line management unit 202 may change the positions and the types of the imaginary lines 411 to 413. For example, the imaginary line management unit 202 changes the position and the type of the imaginary line in accordance with a traffic condition. For example, when the number of vehicles traveling in the +X direction is larger than the number of vehicles traveling in the −X direction, the imaginary line management unit 202 increases the number of traveling roads in the +X direction. By doing so, it is possible to improve the efficiency of transportation of the entire system.

Note that when a line is painted on an actual road, the imaginary line management unit 202 may set the imaginary line so as to interpolate a break in the existing line. When map information includes lane information, the imaginary line management unit 202 may set the imaginary line by integrating it with the lane information of the map information. The imaginary line may be a boundary line that divides various kinds of lanes. The lanes divided by the imaginary line include opposite lanes, exclusive bus lanes, passing lanes, driving lanes, and climbing lanes. The imaginary line may be a division line that divides various kinds of lanes. Alternatively, the imaginary line may be a center line of each lane.

Next, the imaginary stop lines 421 and 422 are described. The imaginary stop line 421 is an imaginary line crossing the traveling direction of the vehicle. For example, the imaginary stop line 421 is disposed along the Y direction and is perpendicular to the high-speed traveling road 401b and the low-speed traveling road 403. Thus, the imaginary stop line 421 intersects the imaginary line 413.

The vehicle is controlled so as to stop before the imaginary stop line 421. The imaginary stop line 421 has the same function as that of a stop signal (a red light). That is, each vehicle performs automated driving control so that it does not go over the imaginary stop line 421. For example, the high-speed vehicle 301b and the low-speed vehicle 303 stop before the imaginary stop line 421. When the imaginary stop line management unit 203 deletes the imaginary stop line 421, the high-speed vehicle 301b and the low-speed vehicle 303 resume traveling.

Figure 4:
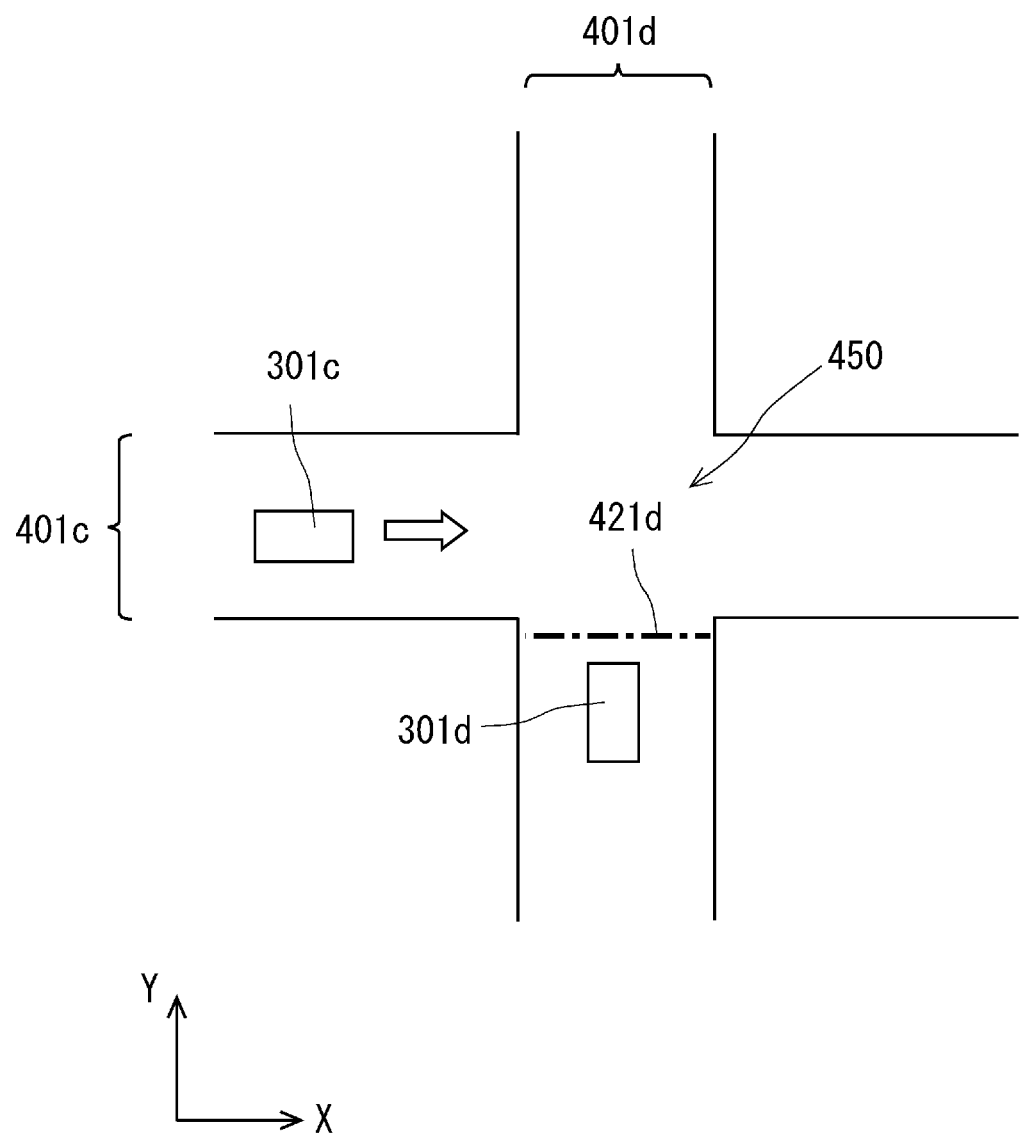
FIG. 4 is a diagram showing an imaginary stop line at an intersection.
Figure 5:
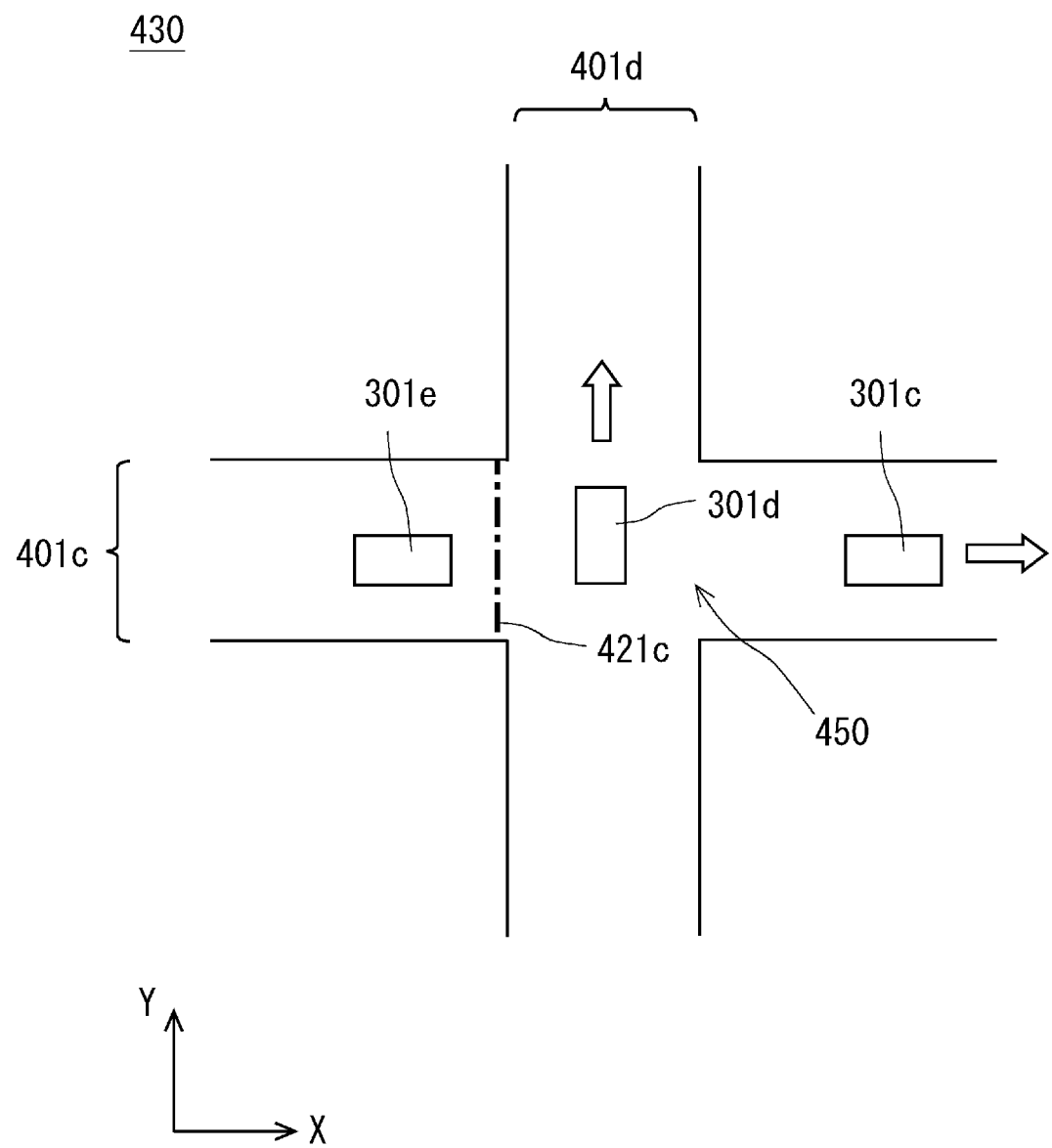
FIG. 5 is a diagram showing an imaginary stop line at the intersection.

For example, at an intersection or a junction, the imaginary stop line parallel to the X direction and the imaginary stop line parallel to the Y direction can be used exclusively. FIGS. 4 and 5 are diagrams showing the imaginary stop line 421 at an intersection 450. FIGS. 4 and 5 show the intersection 450 in which a high-speed travel road 401c along the X direction intersects a high-speed travel road 401d along the Y direction. In FIGS. 4 and 5, in order to make explanations simple, the intersection in which the road in the X direction and the road in the Y direction are each a road for one-way traffic is shown.

The imaginary stop line management unit 203 manages an imaginary stop line 421c and an imaginary stop line 421d. As shown in FIG. 4, the imaginary stop line 421d is parallel to the X direction and is generated on the high-speed traveling road 401d in the Y direction. As shown in FIG. 5, the imaginary stop line 421c is parallel to the Y direction and is generated on the high-speed traveling road 401c in the X direction. In FIG. 4, the imaginary stop line management unit 203 generates the imaginary stop line 421d and deletes the imaginary stop line 421c. In FIG. 5, the imaginary stop line management unit 203 generates the imaginary stop line 421c and deletes the imaginary stop line 421d. The imaginary stop lines 421c and 421d appear exclusively.

First, as shown in FIG. 4, the imaginary stop line management unit 203 makes the imaginary stop line 421d appear and deletes the imaginary stop line 421c. This allows a high-speed vehicle 301c which travels in the +X direction to travel, and stops a high-speed vehicle 301d which travels in the +Y direction before the intersection 450. That is, the high-speed vehicle 301d which travels in the +Y direction is prohibited from entering the intersection 450.

When the high-speed vehicle 301c passes through the intersection 450, the imaginary stop line management unit 203 generates the imaginary stop line 421d and deletes the imaginary stop line 421c as shown in FIG. 5. This allows the vehicle which travels in the +Y direction to travel, and the vehicle passes through the intersection 450. Then, on the high-speed traveling road 401c, a high-speed vehicle 301e traveling subsequent to the high-speed vehicle 301c stops before the intersection 450. That is, the high-speed vehicle 301e which travels in the +X direction is prohibited from entering the intersection 450. In this way, the vehicle can safely pass through the intersection.

In regard to an intersection or the like, a candidate position (a position where the imaginary stop line appears) where the imaginary stop line is disposed is determined in advance in map information, and the imaginary stop line management unit 203 manages both a timing at which an imaginary stop line appears and a timing at which an imaginary stop line is deleted. As a matter of course, for the sake of safety, the imaginary stop line management unit 203 may provide a timing at which the imaginary stop lines 421c and 421d simultaneously appear.

In this way, the imaginary stop line management unit 203 deletes the imaginary stop line after the elapse of a certain period of time. That is, at the intersection 450, the imaginary stop line management unit 203 alternately repeats generation and deletion of the imaginary stop line 421. This makes it possible to temporarily prohibit the entry and the traveling of the vehicle. That is, while the imaginary stop line 421d is made to appear by the imaginary stop line management unit 203, the high-speed vehicle 301d stops before the imaginary stop line 421d. When the imaginary stop line management unit 203 deletes the imaginary stop line 421d after the elapse of a certain period of time, the high-speed vehicle 301d can pass through the position where the imaginary stop line 421d was located.

In regard to a position where roads in different directions intersect each other or roads merge with each other in the map information, the imaginary stop line management unit 203 may determine a pattern for managing the imaginary stop line 421 in accordance with the elapse of time. For example, the position where the imaginary stop line 421 appears may be determined in advance for each road, and the imaginary stop line management unit 203 may manage a timing at which the imaginary stop line 421 appears and a timing at which the imaginary stop line 421 is deleted.

Specifically, at a first timing, the imaginary stop line management unit 203 makes one imaginary stop line 421d appear and deletes the other imaginary stop line 421c as shown in FIG. 4. At a second timing, the imaginary stop line management unit 203 deletes one imaginary stop line 421d and makes the other imaginary stop line 421c appear as shown in FIG. 5. The imaginary stop line management unit 203 manages the imaginary stop lines 421c and 421d so that the first timing and the second timing alternately come. As a matter of course, at the time of performing switching from the first timing to the second timing and at the time of performing switching from the second timing to the first timing, a third timing at which both of the imaginary stop lines 421c and 421d appear may be provided.

The imaginary stop line management unit 203 may generate and delete the imaginary stop line 421 for a pedestrian crossing or the like. For example, at a timing when a pedestrian signal of the pedestrian crossing is blue (green), the imaginary stop line management unit 203 may generate the imaginary stop line 421. On the other hand, at a timing when the pedestrian signal of the pedestrian crossing is red, the imaginary stop line management unit 203 deletes the imaginary stop line 421.

Every time the communication unit 204 updates information of the imaginary stop line 421, the communication unit 204 may transmit imaginary stop line information about the imaginary stop line 421 to each vehicle or may transmit the same at fixed time intervals to each vehicle. Note that the communication unit 204 may transmit update information of the imaginary stop lines 421c and 421d in the intersection 450 only to the vehicles traveling in the vicinity of the intersection 450. In this case, the management apparatus 200 may acquire position information and the like of each vehicle. Further, when a timing at which the imaginary stop line is updated is determined in advance, the communication unit 204 may transmit in advance a time table indicating this update timing.

Referring again to FIG. 3, the explanation will be continued. The imaginary stop line 422 is an imaginary line that defines a parking space (a parking area 430). For example, the imaginary stop line 422 is formed so as to surround the parking area 430 where a low-speed vehicle 303c is parked. By doing the above, the low-speed vehicle 303c cannot go outside the parking area 430. Further, the vehicles other than the low-speed vehicle 303c cannot enter inside the parking area 430. Thus, the low-speed vehicle 303c can be safely parked.

For example, a passenger or the like of the low-speed vehicle 303c sets a parking time, and transmits this information (parking information) to the management apparatus 200. The passenger inputs the parking information by operating a portable terminal such as a smartphone or a vehicle-mounted terminal. The parking information includes an ID of the vehicle, a parking place, a parking time, and the like. The portable terminal or the vehicle-mounted terminal transmits the parking information to the management apparatus 200.

The imaginary stop line management unit 203 manages the imaginary stop line 422 based on the parking information received from the low-speed vehicle 303c. That is, when the low-speed vehicle 303c has entered the parking area 430, the imaginary stop line management unit 203 makes the imaginary stop line 422 appear. Further, after the parking time exceeds a set period of time or in response to a request from a passenger or the like, the imaginary stop line management unit 203 deletes the imaginary stop line 422. By doing so, the low-speed vehicle 303c can be parked at a desired location for a desired period of time. Further, a parking fee corresponding to the set period of time may be automatically collected. Further, the parking area may be changed in accordance with the parking place. In this case, information about a payer and a payment method may be registered for each vehicle.

Figure 6:
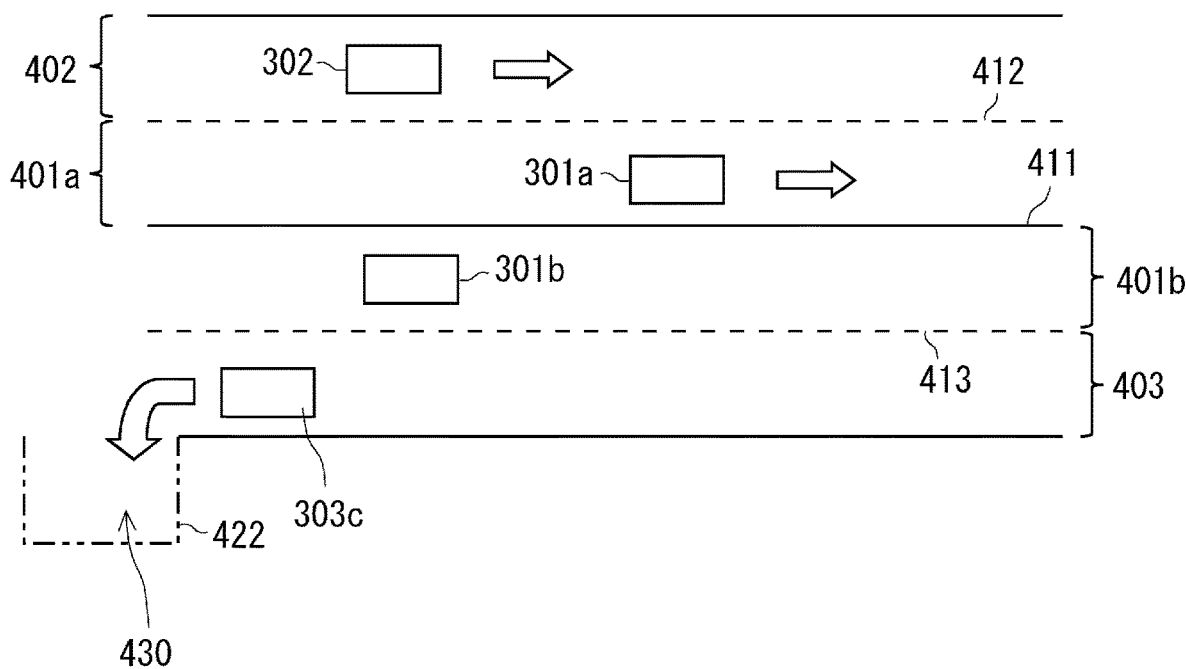
FIG. 6 is a diagram for explaining a parking area defined by the imaginary stop line.

Note that the imaginary stop line management unit 203 may manage only a part of the imaginary stop line 422 having a rectangular frame shape. For example, the imaginary stop line management unit 203 may leave only one side of the imaginary stop line 422 where the vehicle enters open and make the remaining three sides thereof always appear. As shown in FIG. 6, before the low-speed vehicle 303c is parked, the imaginary stop line management unit 203 deletes only one side of the imaginary stop line 422 adjacent to the low-speed traveling road 403. In FIG. 6, one side of the rectangular imaginary stop line 422 is opened, and thus is U-shaped. The low-speed vehicle 303c traveling on the low-speed traveling road 403 enters the parking area 430 from the open side. Then, when the low-speed vehicle 303c is parked in the parking area 430, the open side is closed as shown in FIG. 3.

As described above, when the imaginary stop line management unit 203 generates the imaginary stop line 422, the vehicles cannot go over the imaginary stop line 422. Therefore, the low-speed vehicle 303c cannot exit the parking area 430. Further, the vehicles other than the low-speed vehicle 303c cannot enter the parking area 430. Alternatively, the imaginary stop line management unit 203 may draw the imaginary stop line 422 and make the imaginary stop line 422 and vehicle control work together, so that the low-speed vehicle 303c is prevented from exiting the parking area 430 after it enters it. By doing so, it is possible to prevent the low-speed vehicle 303c from going over the imaginary stop line 422. Further, when the parked low-speed vehicle 303c departs, imaginary stop line information is updated so that the imaginary stop line management unit 203 deletes a part of the imaginary stop line 422.

Figure 7:
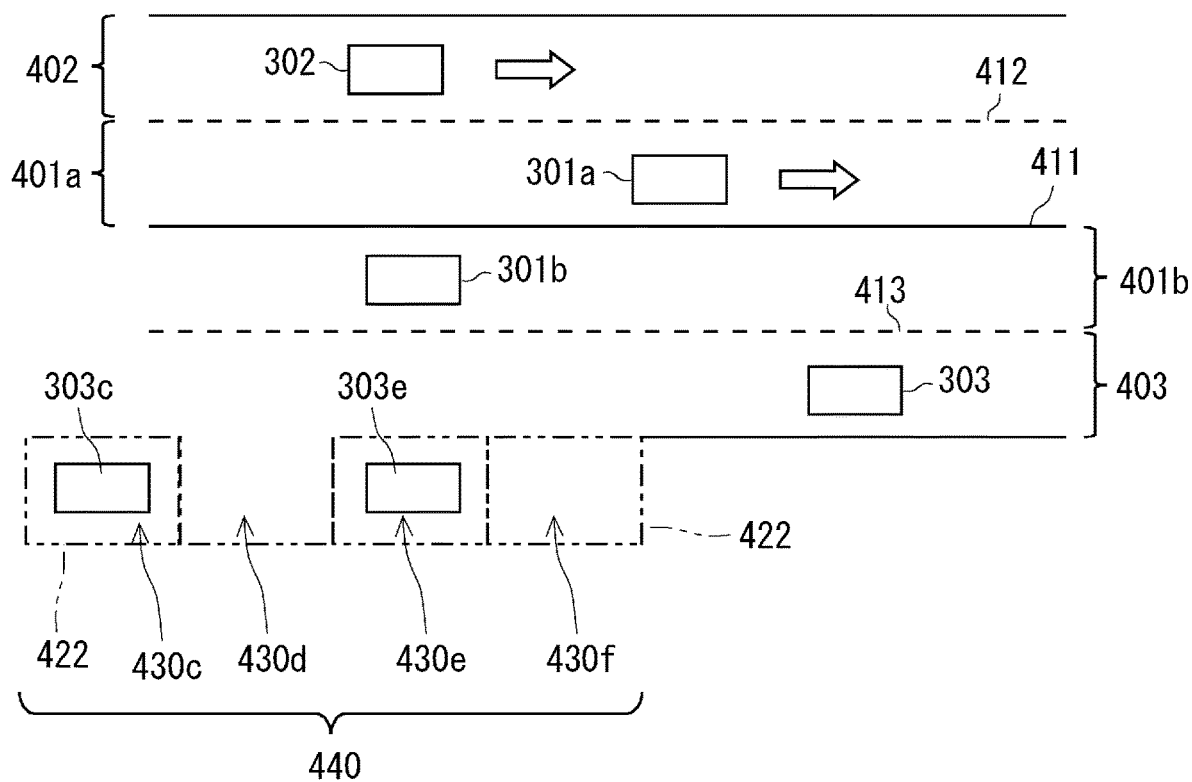
FIG. 7 is a diagram for explaining the parking area defined by the imaginary stop line.

Further, when there are a plurality of parking areas 430, the imaginary stop line management unit 203 may draw the imaginary stop line 422 for each parking area 430. FIG. 7 shows a parking lot 440 having four parking areas 430c to 430f. In the parking areas 430c and 430e where the low-speed vehicle 303c and a low-speed vehicle 303e, respectively, are parked, the respective imaginary stop lines 422 are closed as in the case of FIG. 3. In the parking area 430d where the vehicle is not parked, one side of the imaginary stop line 422 is opened as in the case of FIG. 6. The vehicle to be parked next can use this parking area 430d. Thus, the imaginary stop line management unit 203 can appropriately manage the imaginary stop line 422 for each parking area 430.

Further, even when the vehicle is not parked, the imaginary stop line management unit 203 may close the open side of the imaginary stop line 422. For example, when a passenger or the like has reserved the parking area 430f in advance, the imaginary stop line management unit 203 generates the imaginary stop line 422 so as to surround the reserved parking area 430f. Then, when the vehicle of the passenger who has reserved the parking area 430f approaches the parking area 430f, the imaginary stop line management unit 203 opens one side of the imaginary stop line 422.

As described above, the imaginary stop line 422 is a line that defines the parking area 430. Thus, the imaginary stop line management unit 203 can appropriately manage the parking area 430. Accordingly, each vehicle can be efficiently parked, and convenience can be enhanced.

Figure 8:
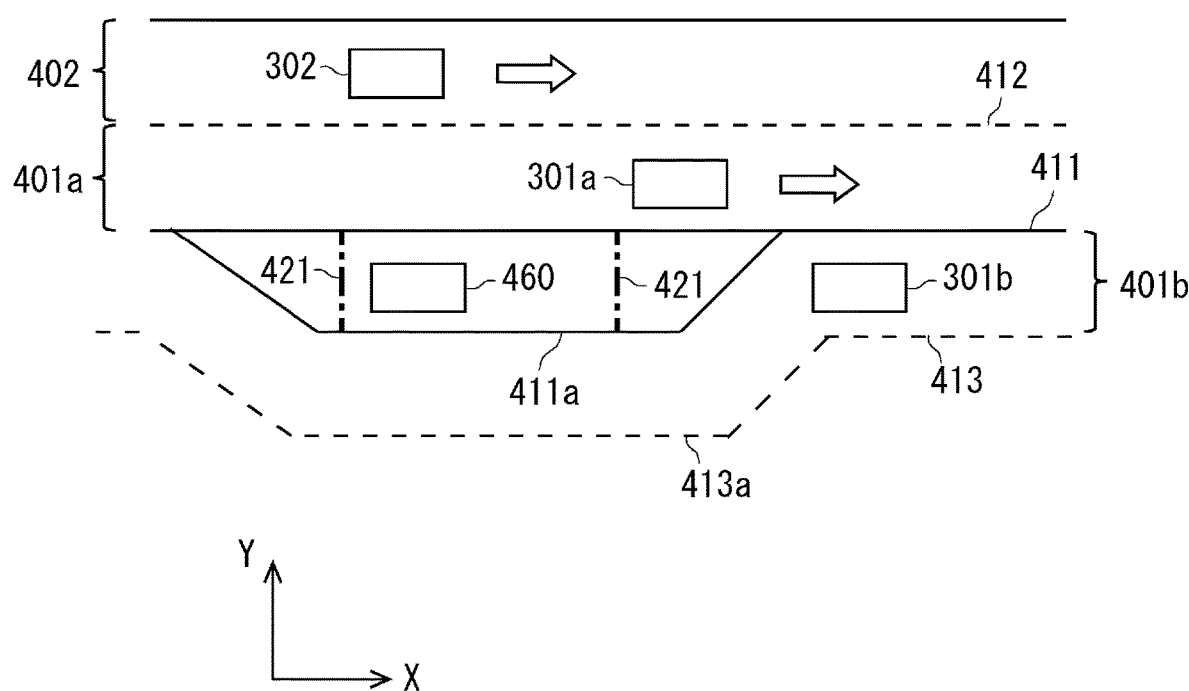
FIG. 8 is a diagram showing the imaginary line and the imaginary stop line newly generated when an obstacle is detected.

When there is an obstacle on the traveling road, the imaginary line management unit 202 and the imaginary stop line management unit 203, respectively, may manage the imaginary line and the imaginary stop line in response to the obstacle. FIG. 8 shows a case in which there is an obstacle 460 on the high-speed traveling road 401b. The imaginary stop line management unit 203 generates the imaginary stop lines 421 before and after the obstacle 460. Alternatively, the imaginary line management unit 202 generates an imaginary line 411a and an imaginary line 413a so as to avoid the obstacle 460.

By doing so, the high-speed traveling road 401b is bent so as to avoid the obstacle 460. The high-speed vehicle 301b travels along the newly generated imaginary lines 411a and 413a. That is, the high-speed vehicle 301b travels between the imaginary lines 411a and 413c. The high-speed vehicle 301 traveling on the high-speed traveling road 401b can travel so that it avoids the obstacle 460.

For example, the obstacle 460 suddenly appears. For example, a falling rock, a disabled car, a cave-in hole in the road, or a flying object can be the obstacle 460. In this case, the management apparatus 200 collects obstacle information indicating information such as a position, a size, and a type of the obstacle 460 from the vehicles traveling in the vicinity of the obstacle 460. For example, when various sensors provided in the vehicle detect an obstacle, obstacle information about this obstacle is transmitted to the management apparatus 200. Alternatively, a person in charge of managing the traveling area or the road may input obstacle information about the obstacle 460 to the management apparatus 200. Then, the imaginary stop line management unit 203 generates the imaginary stop line 421 or the imaginary stop line 422 based on the collected obstacle information pieces. When the obstacle 460 is removed, the imaginary stop line management unit 203 deletes and updates the imaginary stop lines 421 and 422. In this way, the management apparatus 200 can appropriately manage the vehicles.

Alternatively, a place where road construction or the like is scheduled to begin may be the obstacle 460. In this case, the construction manager or the like can set a position and a duration of the imaginary stop line 421 in accordance with a construction site and a construction period. The imaginary stop line management unit 203 can generate the imaginary stop line 421 for a place that obstructs the traveling of the vehicle. Further, the imaginary stop line management unit 203 may generate the imaginary stop line 421 so that it surrounds the obstacle 460.

Note that when the obstacle 460 is detected, the management apparatus 200 may update either of the imaginary line and the imaginary stop line. For example, when the imaginary stop line management unit 203 newly generates only the imaginary stop line 422, lane changes or the like may be performed so that the vehicle does not go over the imaginary stop line 422.

Figure 9:
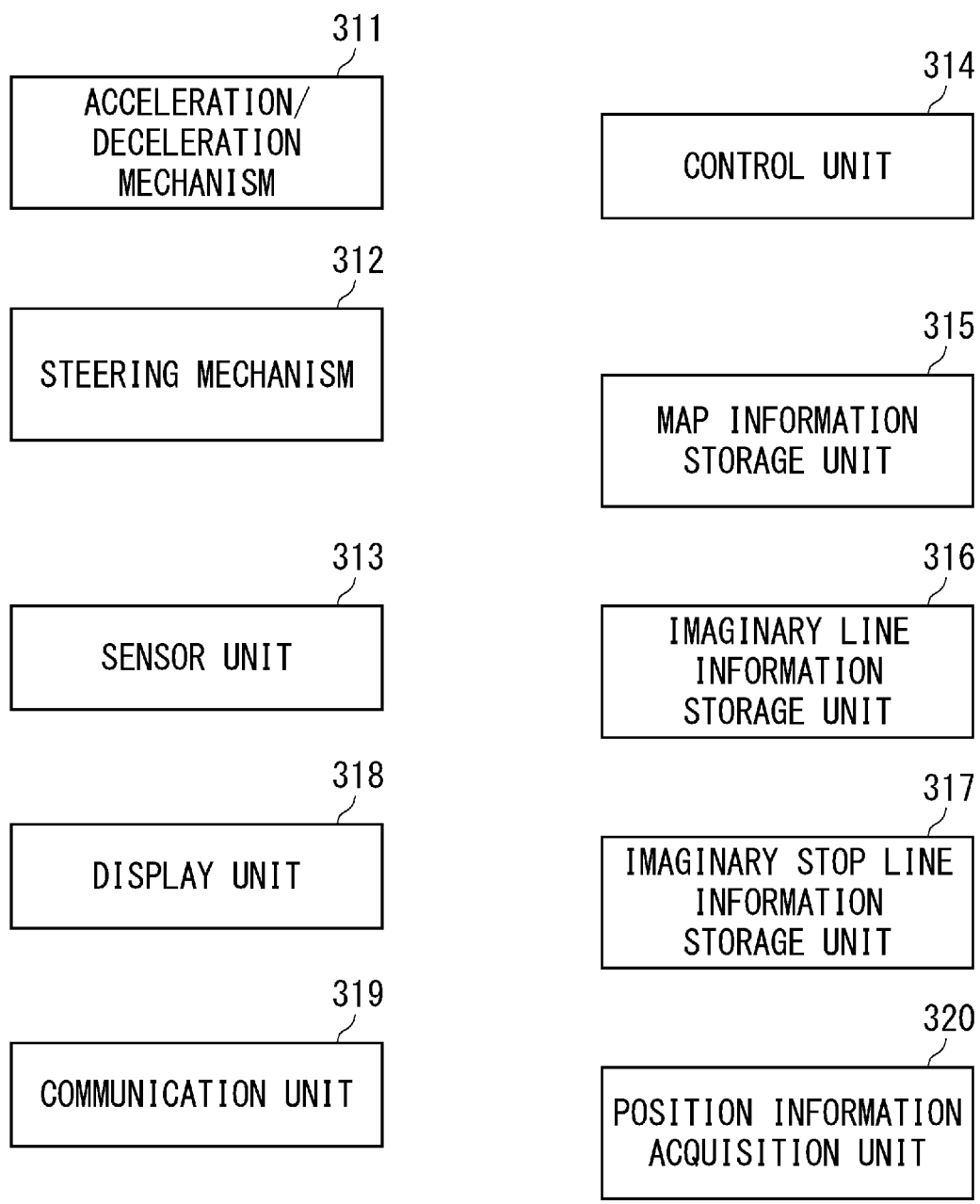
FIG. 9 is a block diagram showing a control system of a vehicle.

A control system of a vehicle 300 is described with reference to FIG. 9. FIG. 9 is a block diagram showing the control system of the vehicle 300. The vehicle 300 includes an acceleration/deceleration mechanism 311, a steering mechanism 312, a sensor unit 313, a control unit 314, and a map information storage unit 315. The vehicle 300 includes an imaginary line information storage unit 316, an imaginary stop line information storage unit 317, a display unit 318, a communication unit 319, and a position information acquisition unit 320.

The acceleration/deceleration mechanism 311 controls speed of the vehicle 300. That is, the acceleration/deceleration mechanism 311 operates an accelerator and a brake of the vehicle 300 so that the vehicle 300 travels at a desired speed. Note that the vehicle 300 may be an electric vehicle or a gasoline-powered vehicle. The acceleration/deceleration mechanism 311 may directly control an engine, a motor, and the like of the vehicle 300.

The steering mechanism 312 controls a traveling direction of the vehicle. That is, the steering mechanism 312 operates the steering of the vehicle 300 so that the vehicle 300 travels in a desired direction. The steering mechanism 312 controls the steering angles of the wheels.

The sensor unit 313 detects information about an environment in which the vehicle 300 is traveling. For example, the sensor unit 313 includes various sensors such as a camera, a stereo camera, a millimeter-wave radar, a laser range finder, a distance sensor, an acceleration sensor, a gyro sensor, and a GPS sensor. It is possible to recognize the surroundings from an image around the vehicle shot by a camera or a stereo camera. Further, it is possible to detect a distance to a nearby vehicle or object by a millimeter-wave radar, a laser range finder, a distance sensor, and the like. As a matter of course, the sensor unit 313 may include the one or more aforementioned sensors of various kinds, and may include sensors other than those illustrated above. The sensor unit 313 outputs information which the sensor has detected to the control unit 314 or the like.

The map information storage unit 315 stores map information of the traveling area 400. The map information storage unit 315 includes a memory or the like for storing the map information. The map information may be map information transmitted from the management apparatus 200. Further, the map information may be map information of a general-purpose navigation system.

The imaginary line information storage unit 316 stores imaginary line information. The imaginary line information storage unit 316 includes a memory or the like for storing the imaginary line information. The imaginary line information includes information about a position and a type of the imaginary line. The imaginary line information transmitted from the management apparatus 200 is stored in the memory or the like.

The imaginary stop line information storage unit 317 stores imaginary stop line information. The imaginary stop line information storage unit 317 includes a memory or the like for storing the imaginary stop line information. The imaginary stop line information includes information about a position and a type of the imaginary stop line. The imaginary stop line information transmitted from the management apparatus 200 is stored in the memory or the like.

The position information acquisition unit 320 acquires position information of its own vehicle. The position information acquisition unit 320 acquires the current position of the vehicle 300. The position information acquisition unit 320 acquires the current position of its own vehicle, for example, by using a GPS sensor, a vehicle speed pulse, or the like. The position information acquisition unit 320 determines the current position of the vehicle 300. That is, the position information acquisition unit 320 sequentially updates the position of its own vehicle. The position information acquisition unit 320 may acquire position coordinates such as the latitude and the longitude by using a positioning system other than the GPS. The position information acquisition unit 320 may acquire the position information based on a result of the detection performed by the sensor unit 313. Specifically, the position information acquisition unit 320 may calculate the position information based on the acceleration detected by the acceleration sensor.

Alternatively, the position information may be acquired in accordance with results of operations performed by the acceleration/deceleration mechanism 311 and the steering mechanism 312. The acceleration/deceleration mechanism 311 may output, to the position information acquisition unit 320, acceleration and deceleration information indicating acceleration and deceleration operations. Alternatively, the steering mechanism 312 may output steering information indicating a steering operation to the position information acquisition unit 320. The position information acquisition unit 320 may acquire the position information by combining two or more of the above information pieces. In this way, the position information acquisition unit 320 can calculate the position (the position of its own vehicle) of the vehicle 300 in the map information.

The communication unit 319 transmits and receives data to and from the management apparatus 200. The communication unit 319 and the communication unit 204 transmit and receive data, for example, via a wireless network. For data communication between the vehicle 300 and the management apparatus 200, a general-purpose wireless network such as WiFi (registered trademark), 4G, 5G or the like can be used. When the management apparatus 200 updates the imaginary line information, the imaginary stop line information, the map information, and the like, the communication unit 319 receives these updated information pieces. By doing so, the data of various kinds of information stored in the memory is updated. Further, the communication unit 319 transmits traveling information, destination information, passenger information, and the like of the vehicle 300 to the management apparatus 200. The communication unit 319 sequentially transmits the position of its own vehicle to the management apparatus 200. The management apparatus 200 may manage the imaginary line and the imaginary stop line based on the position of each vehicle.

The display unit 318 includes a display that displays a map or the like corresponding to the map information. The display unit 318 includes display means such as a liquid crystal display or a head-up display (HUD). For example, the display unit 318 may be configured as a monitor of a car navigation system. The display unit 318 superimposes and displays the position of its own vehicle on a map corresponding to the map information. By doing so, the display unit 318 displays an icon indicating the position of its own vehicle on the map corresponding to the map information, so that a passenger can recognize the position of his/her own vehicle on the map.

Further, the display unit 318 may include a touch panel for inputting necessary information. By this configuration, it is possible to input a destination or the like. As a matter of course, the display unit 318 is configured to not only be mounted on the vehicle 300, but also be removable from the vehicle 300. For example, the display unit 318 may be composed of a smart phone, a tablet terminal, or a portable car navigation system. As a matter of course, a passenger may input various kinds of information by voice using a microphone of the portable terminal or a vehicle-mounted microphone.

The control unit 314 includes a processor, a memory, and the like, and controls each of the aforementioned control blocks. When a passenger inputs a destination or a via place, the control unit 314 refers to the map information, the imaginary line information, the imaginary stop line information and the like to retrieve an optimum route. Further, the control unit 314 outputs control signals to the acceleration/deceleration mechanism 311 and the steering mechanism 312 based on the map information, the imaginary line information, the imaginary stop line information, and the like. That is, the control unit 314 controls the acceleration/deceleration mechanism 311 and the steering mechanism 312 so that the vehicle 300 travels on the optimum route. By doing so, the vehicle 300 travels along the imaginary line. The vehicle 300 makes a temporary stop or the like in accordance with the imaginary stop line.

For example, the control unit 314 outputs control signals for controlling the acceleration/deceleration mechanism 311 and the steering mechanism 312. The control unit 314 performs automated driving control using the map information, the position of its own vehicle, and the imaginary line information. The control unit 314 controls the steering mechanism 312 and the like so that the vehicle 300 travels along the imaginary line. Further, the control unit 314 controls the acceleration/deceleration mechanism 311 in accordance with the speed limit or the like of the traveling road. Further, when the sensor unit 313 detects pedestrians or vehicles other than its own vehicle, the control unit 314 controls the steering mechanism 312 and the acceleration/deceleration mechanism 311 so as to avoid them.

Each vehicle 300 has a unique ID. Thus, the management apparatus 200 may collect the traveling information of each vehicle together with the ID assigned thereto, whereby it is possible to facilitate the management of the management system 100. Further, the traveling information may be collected after anonymization of the personal information of a user or a passenger of the vehicle.

The display unit 318 may display the imaginary line or the imaginary stop line. That is, the display unit 318 may display the map information, the imaginary line, and the imaginary stop line on the monitor. The display unit 318 superimposes and displays the imaginary line and the imaginary stop line on the map displayed on a display screen. By doing so, a passenger can recognize that there is a lane in the road, so that he/she can feel safe. The display unit 318 may change a style, a color, a width, and the like of the line for each type of imaginary line and imaginary stop line.

Figure 10:
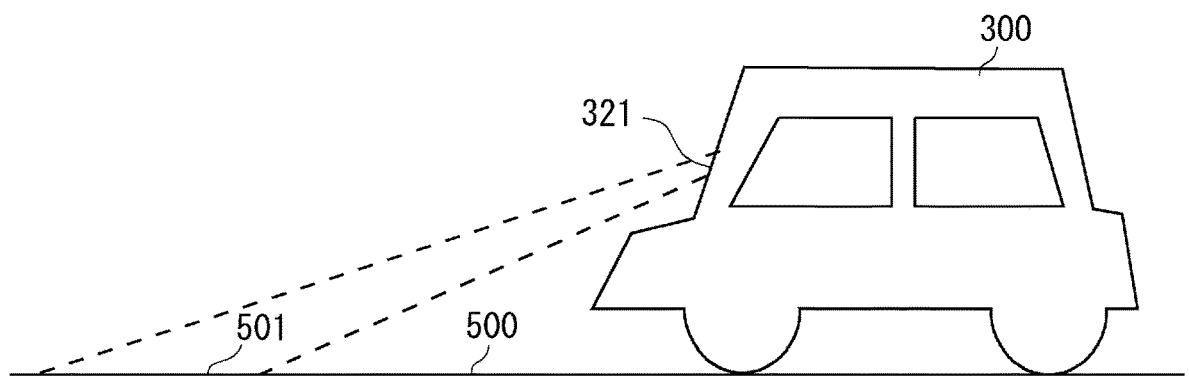
FIG. 10 is a schematic diagram for explaining the imaginary line projected onto a traveling surface.

Further, when the display unit 318 includes a HUD, the display unit 318 may display the imaginary line or the imaginary stop line so that the imaginary line or the imaginary stop line is projected onto the actual traveling surface (the road surface). FIG. 10 is a diagram schematically showing a visual recognition position 501 of the imaginary line projected onto a traveling surface 500. A display light from the HUD is projected onto a windshield 321. The display light from the HUD is projected onto the windshield 321 so that it coincides with the position of the imaginary line in the map information. That is, the visual recognition position 501 where a passenger visually recognizes the imaginary line on the traveling surface 500 coincides with a position (a position where the imaginary line appears) where the imaginary line is generated in the map information.

Accordingly, the passenger can visually recognize the imaginary line as if it were projected onto the traveling surface 500. By doing the above, an image of the imaginary line or an image of the imaginary stop line is formed on the road, and thus the passenger can recognize the imaginary line or the imaginary stop line on the traveling surface 500. That is, the passenger can understand the position of the imaginary line or the imaginary stop line on the road. The display unit 318 may include a projector that projects a display light onto the traveling surface 500.

Further, a manual driving vehicle, instead of an automated driving vehicle, may display the imaginary line or the imaginary stop line on a navigation screen. For example, the management apparatus 200 transmits stop line information and imaginary stop line information to the manual operation vehicle. The imaginary stop line and the imaginary line can be displayed not only on the navigation screen of the automated driving vehicle but also on the navigation screen of the manual driving vehicle. Thus, the driver of the manual driving vehicle can recognize the stop line and the lane. Further, if the manual driving vehicle includes the HUD, it may display the imaginary line or the imaginary stop line as shown in FIG. 10.

Further, the imaginary line and the imaginary stop line may be superimposed on an image obtained by shooting an imaging range including the imaginary line or the imaginary stop line with a camera. For example, it is assumed that a passenger or a pedestrian has a portable terminal such as a smart phone. When the pedestrian or the like shoots the road with a camera of the portable terminal, the portable terminal superimposes and displays the imaginary line or the imaginary stop line on the shot image. By doing so, it is possible for the pedestrian or the passenger to recognize the imaginary line or the imaginary stop line on the display screen of the portable terminal. By using a portable terminal, a display thereof can display the imaginary line and the imaginary stop line like Augmented Reality (AR).

The program executed by the control apparatus 200 or the control unit 314 can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An automated driving vehicle management system comprising:
 a communication interface configured to communicate with a plurality of automated driving vehicles;
 a memory storing:
  map information; and
  imaginary line data, the imaginary line data including at least one of:
   lane line data including data of imaginary lines defining lanes within roads of the map information; and
   stop line data including data of imaginary lines defining stop lines at points within the map information; and
 a processor programmed to:
  access the stored imaginary line data;
  adjust an imaginary line defining a stop line at an intersection to allow traffic to flow through the intersection in a lane that had been stopped by the stop line and stop traffic from crossing the intersection in a lane that had not been stopped by the stop line by (i) removing the imaginary line from across the lane that had been stopped and (ii) simultaneously adding the imaginary line across the lane that had not been stopped; and
  transmit the adjusted imaginary line to the automated driving vehicles;
  wherein the automated driving vehicles perform automatic control based on the transmitted adjusted imaginary line.

2. The automated driving vehicle management system according to claim 1, wherein
 the imaginary line data further includes data of at least one of:
  a division line that divides a lane in a traveling direction of one of the automated driving vehicles from a lane in a direction opposite to the traveling direction;
  a division line that divides lanes in a traveling road on which the automated driving vehicles travel in the same direction in accordance with types of the automated driving vehicles; and
  a division line that divides the lanes in the traveling road on which the automated driving vehicles travel in the same direction in accordance with speed limits of the automated driving vehicles.

3. The automated driving vehicle management system according to claim 1, wherein the processor is further programmed to change a position of the imaginary line.

4. The automated driving vehicle management system according to claim 1, wherein when there is an obstacle on the road, the imaginary lines of the lane line data are generated so as to avoid the obstacle.

5. The automated driving vehicle management system according to claim 1,
 wherein
 the automated driving vehicles stop in accordance with the imaginary lines of the stop line data.

6. The automated driving vehicle management system according to claim 5, wherein the imaginary lines of the stop line data are generated so as to intersect the imaginary lines of the lane line data.

7. The automated driving vehicle management system according to claim 5, wherein a subset of the imaginary lines of the stop line data are generated to surround a parking area.

8. The automated driving vehicle management system according to claim 5, wherein, when there is an obstacle on the road, two of the imaginary lines of the stop line data are generated before and after the obstacle.

9. The automated driving vehicle management system according to claim 1, wherein the automated driving vehicles share the map information and the imaginary line data, and wherein each of the automated driving vehicles performs automated driving control so that it travels in accordance with the imaginary line data.

10. The automated driving system according to claim 9, wherein at least one vehicle of the automated driving vehicles comprises a display for displaying a map corresponding to the map information, and the display superimposes and displays the imaginary line on the map.

11. An automated driving vehicle management method comprising:

transmitting map information to a plurality of automated driving vehicles;

accessing stored imaginary line data;

adjusting an imaginary line defining a stop line at an intersection to allow traffic to flow through the intersection in a lane that had been stopped by the stop line and stop traffic from crossing the intersection in a lane that had not been stopped by the stop line by (i) removing the imaginary line from across the lane that had been stopped and (ii) simultaneously adding the imaginary line across the lane that had not been stopped; and transmitting the adjusted imaginary line to the plurality of automated driving vehicles;

wherein the plurality of automated driving vehicles perform automatic control based on the transmitted adjusted imaginary line.

12. An automated driving vehicle comprising:

a memory storing:

map information; and imaginary line data, the imaginary line data including at least one of:

lane line data including data of imaginary lines defining lanes within roads of the map information; and stop line data including data of imaginary lines defining stop lines at points within the map information; and a processor programmed to:

receive an imaginary line defining a stop line at an intersection that is adjusted to allow traffic to flow through the intersection in a lane that had been stopped by the stop line and stop traffic from crossing the intersection in a lane that had not been stopped by the stop line by (i) removing the imaginary line from across the lane that had been stopped and (ii) simultaneously adding the imaginary line across the lane that had not been stopped;

store the received adjusted imaginary line in the memory; and perform automated driving control so that the automated driving vehicle travels based on the received adjusted imaginary line.

13. A non-transitory computer readable medium storing a computer program for causing a computer to perform an automated driving vehicle management method, the automated driving vehicle management method comprising:

transmitting map information to a plurality of automated driving vehicles;

accessing stored imaginary line data;

adjusting an imaginary line defining a stop line at an intersection to allow traffic to flow through the intersection in a lane that had been stopped by the stop line and stop traffic from crossing the intersection in a lane that had not been stopped by the stop line by (i) removing the imaginary line from across the lane that had been stopped and (ii) simultaneously adding the imaginary line across the lane that had not been stopped; and transmitting the adjusted imaginary line to the plurality of automated driving vehicles;

wherein the plurality of automated driving vehicles perform automatic control based on the transmitted adjusted imaginary line.

* * * * *